United States Patent
Miyake et al.

(10) Patent No.: US 10,831,472 B2
(45) Date of Patent: Nov. 10, 2020

(54) VEHICLE CONTROL SYSTEM AND VEHICLE CONTROL METHOD

(71) Applicant: TOYOTA JIDOSHA KABUSHIKI KAISHA, Toyota (JP)

(72) Inventors: Masaki Miyake, Toyota (JP); Teppei Fukuzawa, Toyota (JP); Shuji Matsuno, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/277,182

(22) Filed: Feb. 15, 2019

(65) Prior Publication Data

US 2019/0278587 A1    Sep. 12, 2019

(30) Foreign Application Priority Data

Mar. 7, 2018    (JP) .................................. 2018-040982

(51) Int. Cl.
*G06F 9/44*    (2018.01)
*G06F 9/445*    (2018.01)
(Continued)

(52) U.S. Cl.
CPC .................. *G06F 8/71* (2013.01); *G06F 8/60* (2013.01); *G06F 8/61* (2013.01); *B60R 16/0231* (2013.01);
(Continued)

(58) Field of Classification Search
CPC ..... G06F 8/71; G06F 8/60; G06F 8/61; B60R 16/0231; B60W 50/00; B60W 2050/0083; G05D 1/021
See application file for complete search history.

(56) References Cited

U.S. PATENT DOCUMENTS

2008/0028386 A1* 1/2008 Nagamine ............. H04L 41/082
                                                     717/170
2009/0320016 A1* 12/2009 Takatani .................. G06F 8/65
                                                     717/171
(Continued)

FOREIGN PATENT DOCUMENTS

JP    2009-053920 A    3/2009
JP    2010266279 A  * 11/2010

OTHER PUBLICATIONS

Alejandra Ruiz, A safe generic adaptation mechanism for smart cars, 2015, pp. 161-170. https://ieeexplore.ieee.org/stamp/stamp.jsp?tp=&arnumber=7381810&isnumber=7381793 (Year: 2015).*

*Primary Examiner* — Mongbao Nguyen
(74) *Attorney, Agent, or Firm* — Oliff PLC (57) ABSTRACT

A vehicle control system includes a plurality of devices, a first device included in the devices including: a storage configured to store consistency information including a permitted combination of versions of software installed on each of one or more devices in association with each of the control functions; a determination unit configured to determine whether the consistency information consistent with versions of software installed on a part of the devices exists when consistency does not exist in the versions of all software installed on each of the devices; and a performance control unit configured to permit performance of a part of control functions associated with the consistency information consistent with the versions of software installed on the part of the devices when the consistency information consistent with the versions of software installed on the part of the devices exists.

4 Claims, 4 Drawing Sheets

(51) Int. Cl.
*G06F 8/71* (2018.01)
*G06F 8/61* (2018.01)
*G06F 8/60* (2018.01)
*B60R 16/023* (2006.01)
*B60W 50/00* (2006.01)
*G05D 1/02* (2020.01)

(52) U.S. Cl.
CPC ..... *B60W 50/00* (2013.01); *B60W 2050/0083* (2013.01); *G05D 1/021* (2013.01)

(56) References Cited

U.S. PATENT DOCUMENTS

| | | | |
|---|---|---|---|
| 2014/0122446 A1* | 5/2014 | Rose | G06F 16/21 707/691 |
| 2014/0309870 A1* | 10/2014 | Ricci | G06F 21/31 701/36 |
| 2016/0306960 A1* | 10/2016 | Gajulapalli | B61L 3/006 |
| 2017/0060570 A1* | 3/2017 | Miller | G06F 8/65 |
| 2017/0123782 A1* | 5/2017 | Choi | G06F 8/65 |
| 2017/0262277 A1* | 9/2017 | Endo | G06F 8/658 |
| 2018/0018164 A1* | 1/2018 | Kurosawa | B60R 16/0231 |
| 2018/0150290 A1* | 5/2018 | Matsuda | G06F 8/65 |
| 2018/0152341 A1* | 5/2018 | Maeda | G06F 11/00 |
| 2019/0031203 A1* | 1/2019 | Fox | B60W 50/0205 |
| 2019/0034194 A1* | 1/2019 | Fox | G06F 8/654 |
| 2019/0265965 A1* | 8/2019 | Acharya | H04L 12/40 |
| 2019/0315293 A1* | 10/2019 | Arai | G06F 8/65 |

\* cited by examiner

FIRST CONSISTENCY TABLE

```
SYSTEM NUMBER   00001

IN-VEHICLE DEVICE A   12345
IN-VEHICLE DEVICE B   23456
IN-VEHICLE DEVICE C   34567
IN-VEHICLE DEVICE D   45678
```

SECOND CONSISTENCY TABLE

```
CONTROL FUNCTION_1

IN-VEHICLE DEVICE A   12345
IN-VEHICLE DEVICE B   23456
```

```
CONTROL FUNCTION_2

IN-VEHICLE DEVICE A   12345
IN-VEHICLE DEVICE D   45678
```

```
CONTROL FUNCTION_3

IN-VEHICLE DEVICE C   34567
IN-VEHICLE DEVICE D   45678
```

VERSION ACQUISITION EXAMPLE 1

```
IN-VEHICLE DEVICE A   12345
IN-VEHICLE DEVICE B   23456
IN-VEHICLE DEVICE C   34567
IN-VEHICLE DEVICE D   45678
```

VERSION ACQUISITION EXAMPLE 2

```
IN-VEHICLE DEVICE A   12345
IN-VEHICLE DEVICE B   23457
IN-VEHICLE DEVICE C   34567
IN-VEHICLE DEVICE D   45678
```

VEHICLE CONTROL SYSTEM AND VEHICLE CONTROL METHOD

INCORPORATION BY REFERENCE

The disclosure of Japanese Patent Application No. 2018-040982 filed on Mar. 7, 2018 including the specification, drawings and abstract is incorporated herein by reference in its entirety.

BACKGROUND

1. Technical Field

The present disclosure relates to a vehicle control system and a vehicle control method.

2. Description of Related Art

Various automated driving systems have been being developed in recent years. Such an automated driving system is configured by combining a plurality of in-vehicle devices performing vehicle control such as acceleration, deceleration and steering. In a system composed of a plurality of in-vehicle devices, such as an automated driving system, there is a possibility that unexpected vehicle control is performed when a combination of versions of software of the in-vehicle devices is not consistent with a combination of versions of software which combination is beforehand confirmed to operate. Accordingly, for such a system composed of a plurality of in-vehicle devices, it is important to examine consistency in versions of software of the plurality of in-vehicle devices.

For example, Japanese Patent Application Publication No. 2009-53920 discloses a system composed of a plurality of ECUs. In the system, in order to prevent occurrence of operation failure due to inconsistency in versions of programs of the ECUs, referring to dependency relation information between a version-upgrading program for an ECU the program of which is to be updated and the programs of the other ECUs before update of the program, it is determined whether or not the program can be updated.

SUMMARY

In the aforementioned vehicle control system composed of the plurality of in-vehicle devices, in the case where versions of software of one or some of in-vehicle devices are not consistent with the version which is confirmed to operate, when all the control functions composing the vehicle control by the vehicle control system are prohibited, there is a possibility that convenience of a user deteriorates.

The present disclosure provides a vehicle control system and a vehicle control method capable of improving convenience of a user even in a situation where use of one or some of in-vehicle devices is restricted.

A vehicle control system according to a first aspect of the present disclosure is configured to perform predetermined vehicle control with a combination of a plurality of control functions. The system includes a plurality of devices mounted on a vehicle and including a first device, the control functions being attained by performing each software installed on the devices, wherein the first device includes: a first storage configured to store first consistency information including a permitted combination of versions of all software installed on each of the devices; a second storage configured to store second consistency information including one or more devices and a permitted combination of versions of software installed on each of the one or more devices in association with each of the control functions; a version acquisition unit configured to acquire versions of software installed on the other devices than the first device; a first determination unit configured to determine whether consistency exists in the versions of all software installed on each of the devices by collating the version of software installed on the first device and the versions of software acquired from the other devices with the first consistency information; a second determination unit configured to determine whether the second consistency information consistent with versions of software installed on a part of the devices exists by collating the version of software installed on the first device and the versions of software acquired from the other devices with each piece of the second consistency information when the first determination unit determines that consistency does not exist in the versions of all software installed on each of the devices; and a performance control unit configured to permit performance of all of the control functions when the first determination unit determines that consistency exists in the versions of all software installed on each of the devices and permit performance of a part of control functions associated with the second consistency information consistent with the versions of software installed on the part of the devices and prohibit performance of the other control functions of the vehicle control system when the second determination unit determines that the second consistency information consistent with the versions of software installed on the part of the devices exists.

According to the first aspect, even when versions of software of one or some of in-vehicle devices composing the vehicle control system are not consistent with permitted versions, control functions which can be performed by one or some of in-vehicle devices holding software consistent with the permitted versions can be provided. Even when use of one or some of in-vehicle devices is restricted and not all the control functions of the vehicle control system can be provided, one or some of control functions are allowed to be provided, and thereby, convenience of a user can be improved.

In the aforementioned aspect, the first determination unit and the second determination unit may be configured to perform determination processing every time when a power supply of a vehicle is turned on.

According to the aforementioned configuration, since it can be examined that consistency exists in the versions of all software installed on each of the in-vehicle devices composing the vehicle control system every time when the power supply of the vehicle is turned on, there can be more reduced a possibility that unexpected vehicle control is performed due to inconsistency in the versions of software of the in-vehicle devices.

In the aforementioned aspect, the permitted combination of versions of software may be a combination of versions of the software which are permitted to be performed simultaneously.

A vehicle control method according to a second aspect of the present disclosure is in a vehicle control system composed of a plurality of devices mounted on a vehicle and configured to perform predetermined vehicle control with a combination of a plurality of control functions attained by performing each software installed on the devices. The method includes: storing, by a computer which a first device included in the devices has, first consistency information including a permitted combination of versions of all software installed on each of the devices; storing, by the computer, second consistency information including one or more devices and a permitted combination of versions of software installed on each of the one or more devices in association with each of the control functions; acquiring, by the computer, versions of software installed on the other devices than the first device; determining, by the computer, whether consistency exists in the versions of all software installed on each of the devices by collating the version of software installed on the first device and the versions of software acquired from the other devices with the first consistency information; determining, by the computer, whether the second consistency information consistent with versions of software installed on a part of the devices exists by collating the version of software installed on the first device and the versions of software acquired from the other devices with each piece of the second consistency information when the computer determines that consistency does not exist in the versions of all software installed on each of the devices; permitting, by the computer, performance of all of the control functions when the computer determines that consistency exists in the versions of all software installed on each of the devices; and permitting, by the computer, performance of a part of control functions associated with the second consistency information consistent with the versions of software installed on the part of the devices and prohibiting, by the computer, performance of the other control functions of the vehicle control system when the computer determines that the second consistency information consistent with the versions of software installed on the part of the devices exists.

According to the second aspect, even when versions of software of one or some of in-vehicle devices composing the vehicle control system are not consistent with permitted versions, control functions which can be performed by one or some of in-vehicle devices holding software consistent with the permitted versions can be provided. Even when use of one or some of in-vehicle devices is restricted and not all the control functions of the vehicle control system can be provided, one or some of control functions are allowed to be provided, and thereby, convenience of a user can be improved.

According to the present disclosure, there can be provided a vehicle control apparatus and a vehicle control method capable of improving convenience of a user even in a situation where use of one or some of in-vehicle devices is restricted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Even when versions of software of one or some of in-vehicle devices composing a vehicle control system are not consistent with a permitted version, the present disclosure enables to provide control functions that can be executed by one or some of in-vehicle devices holding software that is consistent with the permitted version. Even when not all the control functions of the vehicle control system can be provided, one or some of control functions are allowed to be provided, and thereby, convenience of a user is improved.

Embodiment

Configuration

Figure 1:
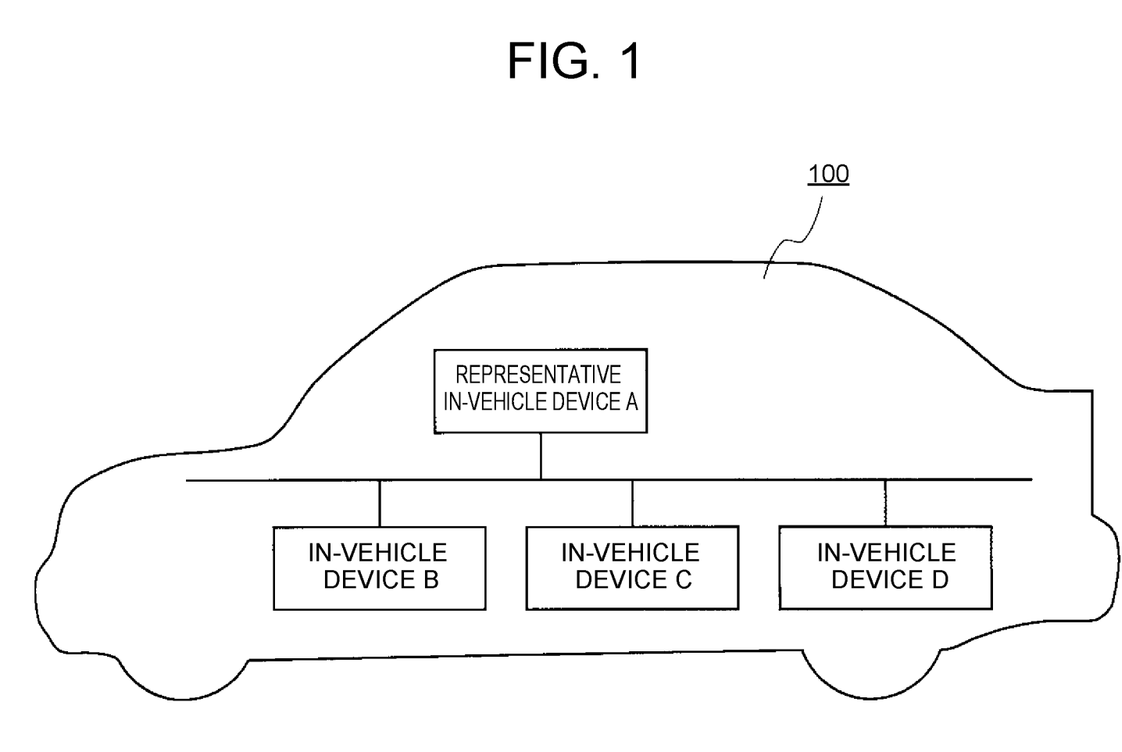
FIG. 1 is a block diagram showing a schematic configuration of a vehicle control system according to an embodiment.

FIG. 1 is a block diagram showing a schematic configuration of a vehicle control system according to an embodiment.

A vehicle control system 100 is a system which is composed of in-vehicle devices A to D which can communicate with one another and which realizes predetermined vehicle control by combining control functions of the in-vehicle devices A to D. While in the example of FIG. 1, the vehicle control system 100 is composed of the four in-vehicle devices A to D, the number of in-vehicle devices composing the vehicle control system 100 is not limited to four. Examples of the predetermined vehicle control realized by the vehicle control system 100 include automated driving. The in-vehicle devices A to D correspond to ECUs which control vehicle travelling such as acceleration, deceleration and steering, and a ECU which combines those ECUs controlling the vehicle travelling to perform travelling assistance. Notably, in the following description, a specific in-vehicle device A which is one of the plurality of in-vehicle devices A to D composing the vehicle control system is referred to as "representative in-vehicle device A".

Figure 2:
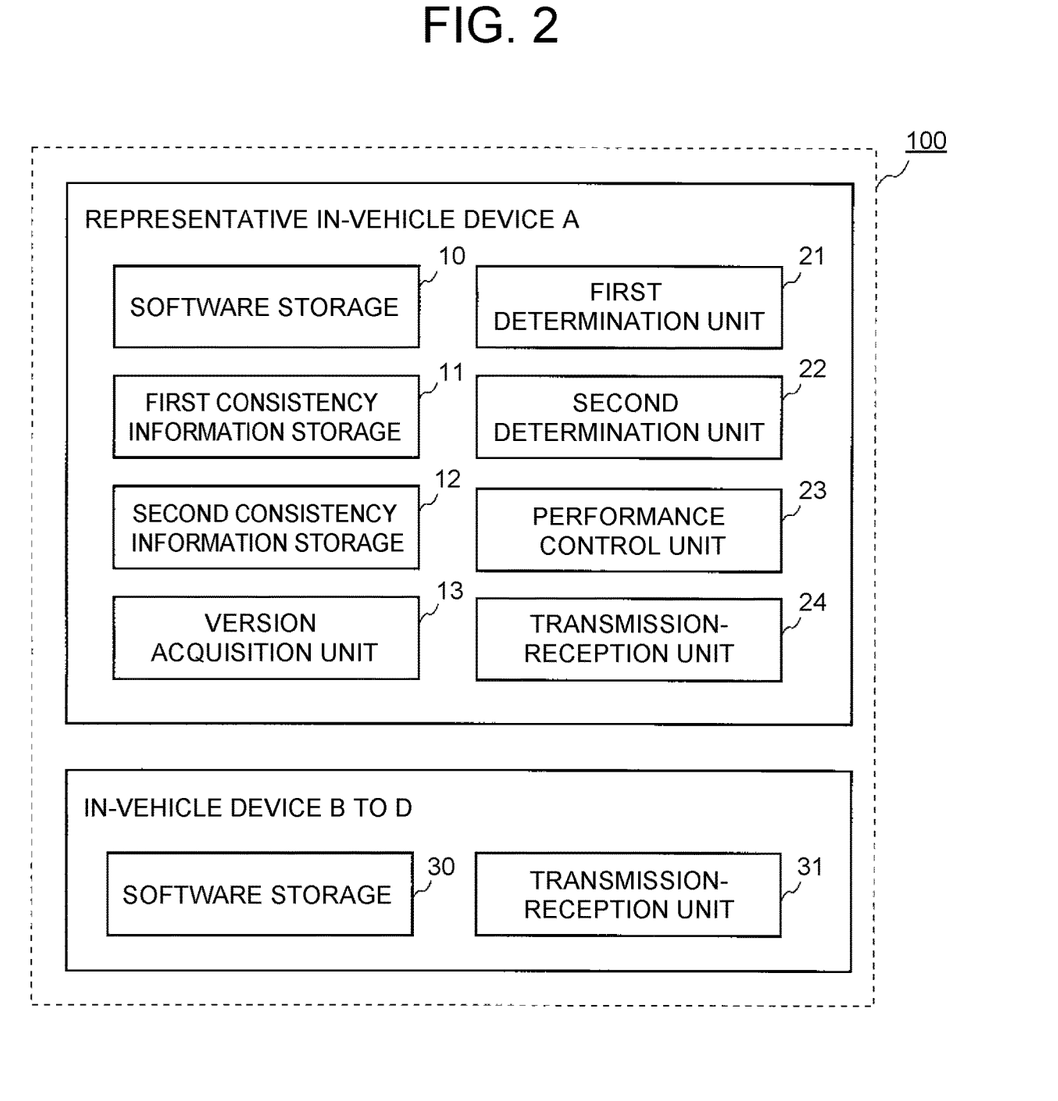
FIG. 2 is a functional block diagram of the vehicle control system shown in FIG. 1.
Figure 3:
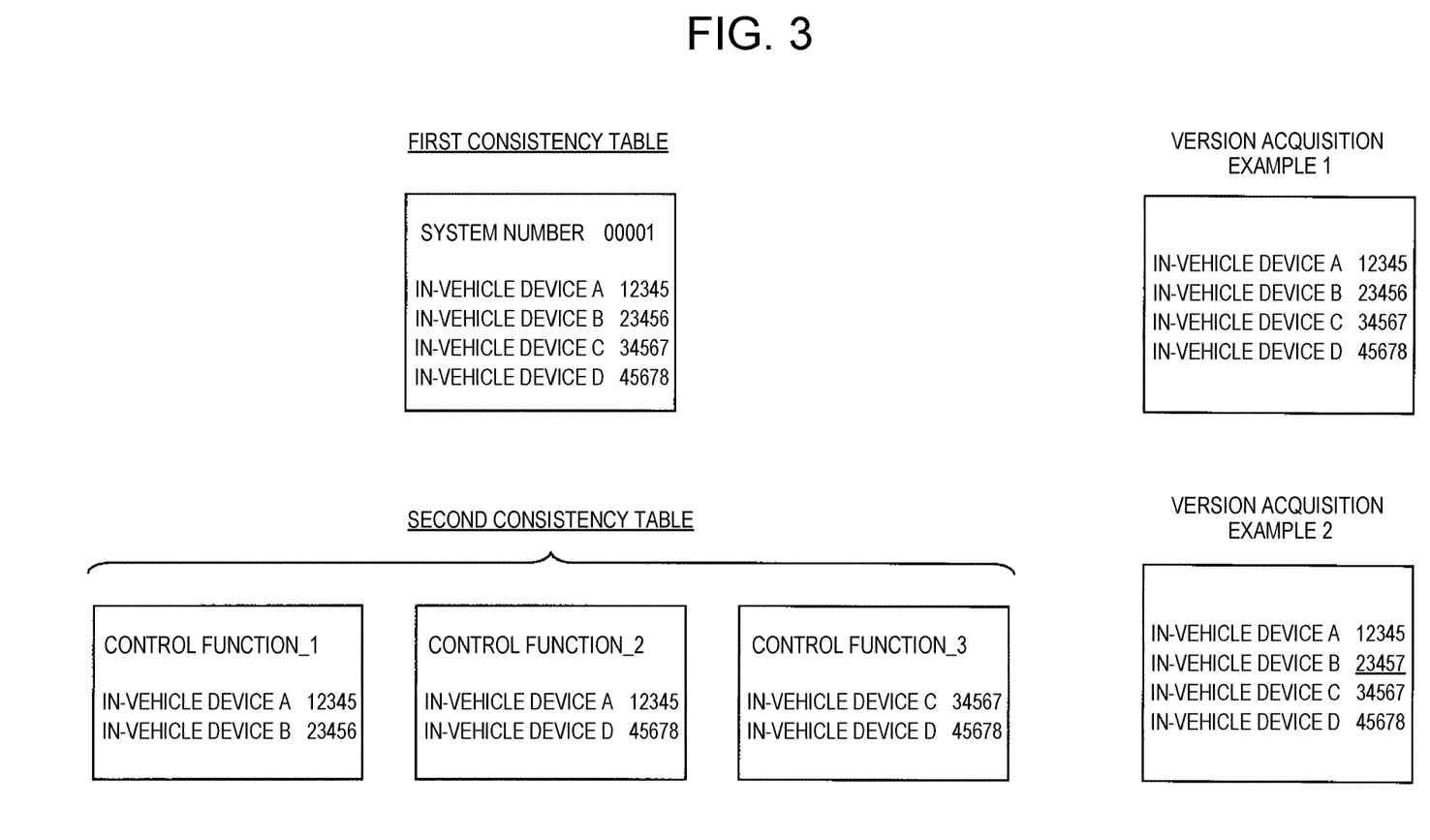
FIG. 3 is a diagram for explaining a consistency determination method of versions of software in an embodiment.

FIG. 2 is a functional block diagram of the vehicle control system shown in FIG. 1. FIG. 3 is a diagram for explaining a consistency determination method of versions of software according to an embodiment.

Representative in-Vehicle Device A

The representative in-vehicle device A is one of the in-vehicle devices providing the control functions of the vehicle control system 100, and functions as a master device in a consistency examination process for versions of software of the in-vehicle devices A to D. The representative in-vehicle device A examines consistency in the versions of software of all the in-vehicle devices A to D composing the vehicle control system 100 with turn-on of a power supply of a vehicle being as a trigger. The representative in-vehicle device A includes a software storage 10, a first consistency information storage 11, a second consistency information storage 12, a version acquisition unit 13, a first determination unit 21, a second determination unit 22, a performance control unit 23 and a transmission-reception unit 24.

The software storage 10 stores software for operating the representative in-vehicle device A. The representative in-vehicle device A executes the software stored in the software storage 10, and thereby, realizes a predetermined function for controlling operation of the vehicle.

The first consistency information storage 11 stores a first consistency table in which a combination of versions of software of all the in-vehicle devices A to D composing the vehicle control system 100 is defined. The combination of versions of software of the in-vehicle devices A to D which combination is defined in the consistency table is a combination with which the vehicle control system 100 is confirmed to normally operate and which includes versions permitted to be simultaneously performed. As shown in FIG. 3, for example, the first consistency table can include a system number for specifying the vehicle control system 100, and versions of software of the in-vehicle devices A to D. For the system number, an identifier for specifying the vehicle control system 100 may be used, or a version of the vehicle control system 100 may be used. Moreover, in the example of the first consistency table in FIG. 3, a single version is defined as the version of each in-vehicle device. Instead, a range of versions of each in-vehicle device which versions can be combined may be defined. Moreover, in the first consistency table, a plurality of sets of combinations of versions (or ranges of versions) may be defined which combination of versions (or ranges of versions) is permitted to be simultaneously performed. When one in-vehicle device holds a plurality of pieces of software, a permitted version for each of the plurality of pieces of software is defined in the first consistency table. The first consistency table is used as first consistency information with which the first determination unit 21 mentioned later determines whether or not consistency exists in versions of software of the in-vehicle devices A to D.

The second consistency information storage 12 stores a second consistency table for examining consistency of a version of software of an in-vehicle device for each control function of the vehicle control system 100. As shown in FIG. 3, in the second consistency table, a control function composing the vehicle control system 100 is associated with one or more in-vehicle devices used for performing the control function and a combination of versions of software of the one or more in-vehicle devices. When one in-vehicle device holds a plurality of pieces of software, a permitted version of each of the plurality of pieces of software is also defined in the second consistency table. In the example presented in the second consistency table shown in FIG. 3, there are a control function_1, a control function_2 and a control function_3 as control functions which can be partially provided out of the plurality of control functions composing the vehicle control by vehicle control system 100. The second consistency table is provided for each of those control functions. For example, there is defined in the table for the control function_1 that the control function_1 is performed by a combination of the in-vehicle devices A and B, and that versions of software of the in-vehicle devices A and B needed for performing the control function_1 are respectively defined as "12345" and "23456". When the vehicle control provided by all the control functions of the vehicle control system 100 is automated driving, examples of the control function_1, control function_2 and control function_3 include a following travelling control function, a lane keeping support function, a lane deviation alarm function and a brake support function. The second consistency tables are used as second consistency information with which the second determination unit 22 mentioned later determines whether or not there is a control function that can be provided using one or some of the in-vehicle devices A to D.

The version acquisition unit 13 acquires the version of software of each of the other in-vehicle devices B to D through communication. When there is an in-vehicle device holding a plurality of pieces of software among the in-vehicle devices B to D, the version acquisition unit 13 acquires all the versions of software held in the in-vehicle device.

The first determination unit 21 determines whether or not consistency exists in the versions of software of all the in-vehicle devices A to D composing the vehicle control system 100. The determination is performed by the first determination unit 21 collating the version of software stored in the software storage 10 of the representative in-vehicle device A and the versions of software acquired from the other in-vehicle devices B to D by the version acquisition unit 13 individually with the first consistency table stored in the first consistency information storage 11.

Specific examples are described. When the versions for the in-vehicle devices acquired by the version acquisition unit 13 are as in version acquisition example 1 shown in FIG. 3, the first determination unit 21 collates the acquired versions with the first consistency table shown in FIG. 3, and as a result, determines that consistency exists in the versions of software of all the in-vehicle devices A to D. On the contrary, when the versions for the in-vehicle devices acquired by the version acquisition unit 13 are as in version acquisition example 2 shown in FIG. 3, the first determination unit 21 collates the acquired versions with the first consistency table shown in FIG. 3, and as a result, determines that consistency does not exist in the versions of software of all the in-vehicle devices A to D since the version for the in-vehicle device B is not consistent with the first consistency table.

The second determination unit 22 determines whether or not there is, among the second consistency tables stored in the second consistency information storage 12, one that is consistent with a combination of versions of software of one or some of the in-vehicle devices composing the vehicle control system 100. The determination is performed by the second determination unit 22 collating the version of software stored in the software storage 10 of the representative in-vehicle device A and the versions of software acquired from the other in-vehicle devices B to D by the version acquisition unit 13 with each of the second consistency tables stored in the second consistency information storage 12. Notably, the determination by the second determination unit 22 is processing performed when the first determination unit 21 determines that consistency does not exist in the versions of software of all the in-vehicle devices A to D composing the vehicle control system 100.

Specific examples are described. When the versions for the in-vehicle devices acquired by the version acquisition unit 13 are as in version acquisition example 2 shown in FIG. 3, as mentioned above, the first determination unit 21 determines that consistency does not exist in the versions of software of all the in-vehicle devices A to D composing the vehicle control system 100. In this case, the second determination unit 22 collates the versions of software of the in-vehicle devices with the combination of the versions of software defined in each of the second consistency tables shown in FIG. 3. In version acquisition example 2 shown in FIG. 3, although the versions of software of the in-vehicle devices A, C and D are consistent with the permitted versions, the version of software of the in-vehicle device B is not consistent with the permitted version. The second determination unit 22 determines that there are the tables for the control function_2 and the control function_3 as second consistency tables that are consistent with the versions of software of one or some of the in-vehicle devices composing the vehicle control system.

The performance control unit 23 controls performance of the control functions of the vehicle control system 100 based on the determination results of the first determination unit 21 and the second determination unit 22. When the first determination unit 21 determines that consistency exists in the versions of software of all the in-vehicle devices A to D composing the vehicle control system 100, the performance control unit 23 permits performance of the vehicle control of the vehicle control system 100 which vehicle control can be performed using all the in-vehicle devices A to D. When the second determination unit 22 determines that there exists a second consistency table consistent with versions of software of one or some of the in-vehicle devices composing the vehicle control system the performance control unit 23 permits performance of only the control function associated with the second consistency table that is determined to exist. When the second determination unit 22 determines that there does not exists a second consistency table consistent with versions of software of one or some of the in-vehicle devices composing the vehicle control system, the performance control unit 23 prohibits performance of all the control functions of the vehicle control system 100.

The transmission-reception unit 24 transmits and receives various kinds of information and instructions to/from the in-vehicle devices B to D.

In-Vehicle Devices B to D

Each of the in-vehicle devices B to D includes a software storage 30 and a transmission-reception unit 31. The software storage 30 stores software for operating each of the in-vehicle devices B to D. Each of the in-vehicle devices B to D executes the software stored in the software storage 30, and thereby, realizes a predetermined function for controlling operation of the vehicle. The transmission-reception unit 31 transmits and receives various kinds of information and instructions to/from the other in-vehicle devices.

Control Processing

Figure 4:
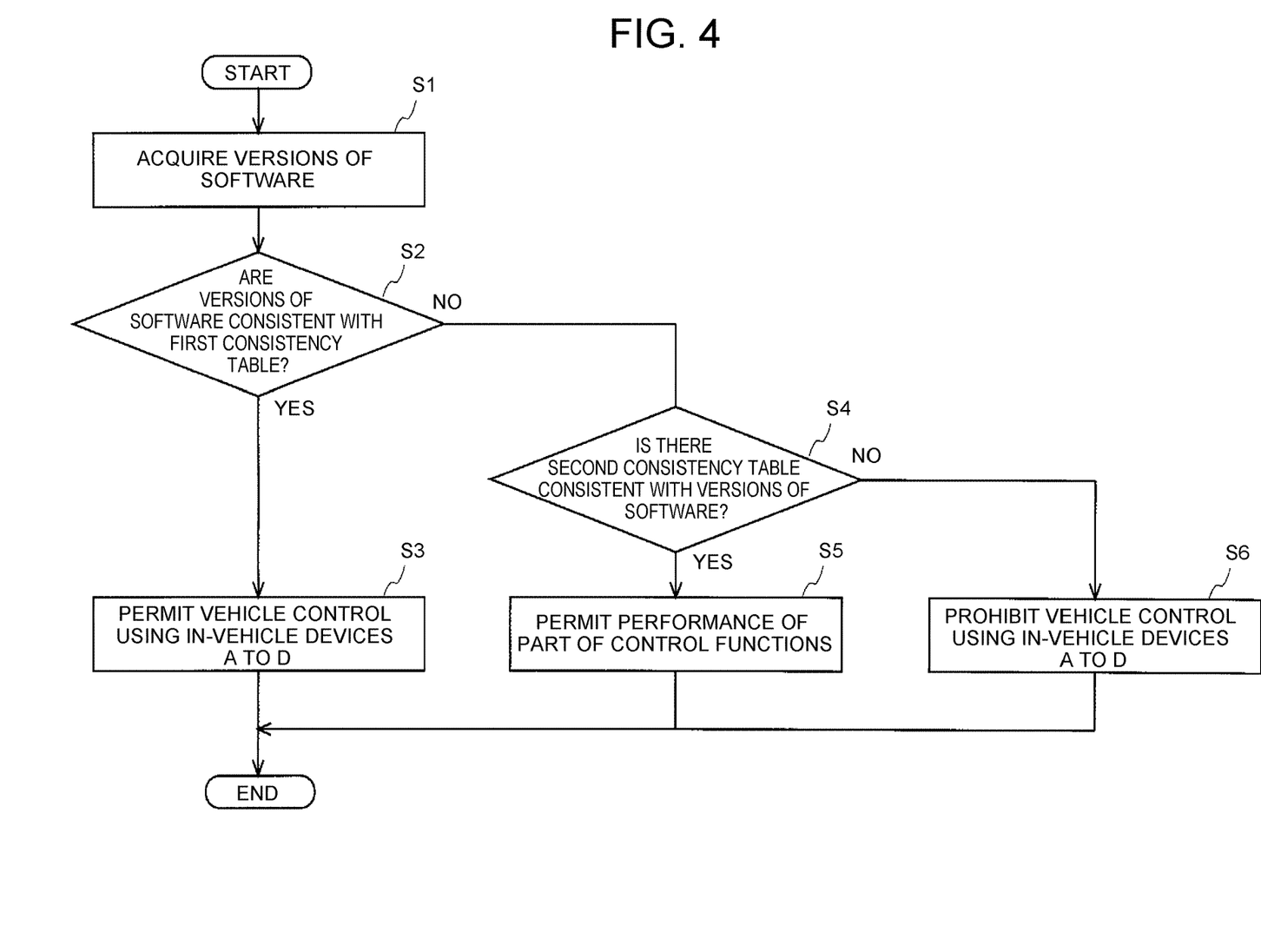
FIG. 4 is a flowchart exemplarily showing control processing performed by a representative in-vehicle device shown in FIG. 1.

Hereafter, with reference to FIG. 2 and FIG. 4, control processing performed by the representative in-vehicle device A is described.

FIG. 4 is a flowchart exemplarily showing control processing performed by the representative in-vehicle device shown in FIG. 1.

Step S1: the version acquisition unit 13 acquires the versions of software of the other in-vehicle devices B to D. After that, the process moves to step S2.

Step S2: the first determination unit 21 collates the version of software of the representative in-vehicle device A and the versions of software acquired from the other in-vehicle devices B to D with the first consistency table stored in the first consistency information storage 11, and determines whether or not consistency exists in the versions of software of the in-vehicle devices A to D. When the determination in step S2 is YES, the process moves to step S3, and in the other case, the process moves to step S4.

Step S3: the performance control unit 23 permits performance of the vehicle control using the in-vehicle devices A to D combined. After that, the process is ended.

Step S4: the second determination unit 22 collates the version of software of the representative in-vehicle device A and the versions of software acquired from the other in-vehicle devices B to D with the second consistency tables stored in the second consistency information storage 12, and determines whether or not a second consistency table consistent with a combination of versions of software of one or some of the in-vehicle devices A to D exists. Notably, since with the determination in step S2, an in-vehicle device having software in a version not consistent with the first consistency table can be specified, the determination processing in step S4 may be performed only using the versions of software of the in-vehicle devices which versions are determined to be consistent with the first consistency table in step S2. When the determination in step S4 is YES, the process moves to step S5, and in the other case, the process moves to step S6.

Step S5: the performance control unit 23 permits performance of control functions associated with the second consistency table determined to exist by the second determination unit in step S4, and prohibits performance of the other control functions of the vehicle control system 100. After that, the process is ended.

Step S6: the performance control unit 23 prohibits performance of all the control functions of the vehicle control system 100. After that, the process is ended.

The aforementioned control processing in FIG. 4 may be realized by a dedicated circuit, or may be realized, for example, by causing a computer such as an ECU having a processor, a ROM, a RAM, a hard disk drive and the like to perform processes in the individual steps. When a computer such as an ECU is caused to perform such control processes in FIG. 4, a program described such that these control processes can be performed may be prestored in a storage apparatus such a ROM and a hard disk drive, and a processor included in the computer may be caused to read the program from the storage apparatus and to execute it.

Effects and Others

As described above, with the vehicle control system 100 according to the present embodiment, even in the case where versions of software of one or some of the in-vehicle devices A to D composing the vehicle control system 100 are not consistent with permitted versions, when control functions that can be performed by one or some of in-vehicle devices that hold software in permitted versions exist, performance of the control function is permitted. Accordingly, even when one or some of in-vehicle devices are restricted to be used as in cases where repair of an in-vehicle device or update of software of an in-vehicle device is needed, one or some of functions of the vehicle control system 100 can be provided. Hence, convenience of a user can be improved.

Notably, the determination processing of the first determination unit 21 and the second determination unit 22 may be performed every time a power supply of a vehicle is turned on. By examining that consistency exists in the versions of software of the in-vehicle devices A to D every time the power supply of the vehicle is turned on, there can be reduced a possibility that unexpected vehicle control is performed due to inconsistency in the versions of software of the in-vehicle devices A to D.

The present disclosure can be used for a vehicle control system which realizes a predetermined vehicle control function with a combination of a plurality of in-vehicle devices.

What is claimed is:

1. A vehicle control method in a vehicle control system composed of a plurality of devices mounted on a vehicle and configured to perform predetermined vehicle control with a combination of a plurality of control functions attained by performing each software installed on the plurality of devices, the method comprising:

storing, by a computer of a first device of the plurality of devices, first consistency information including a permitted combination of versions of all software installed on each of the devices;

storing, by the computer, second consistency information including one or more devices and a permitted combination of versions of software installed on each of the one or more devices in association with each of the control functions;

acquiring, by the computer, versions of software installed on all other devices different than the first device;

determining, by the computer, whether consistency exists in the versions of all software installed on each of the devices by collating the version of software installed on the first device and the versions of software acquired from the other devices with the first consistency information;

determining, by the computer, whether the second consistency information consistent with versions of software installed on a part of the devices exists by collating the version of software installed on the first device and the versions of software acquired from the other devices with each piece of the second consistency information when the computer determines that consistency does not exist in the versions of all software installed on each of the devices;

permitting, by the computer, performance of all of the control functions when the computer determines that consistency exists in the versions of all software installed on each of the devices; and in response to determining that the software versions of the plurality of control functions are not compatible on all of the plurality of devices, permitting, by the computer, performance of a subset of the plurality of control functions on the first device based on the second consistency information indicating that the software versions of the subset of the plurality of control functions are compatible with at least one version of software installed on a subset of a remainder of the plurality of devices, and prohibit performance of a remaining control functions of the plurality of control functions of the vehicle control system.

2. A vehicle control system configured to perform predetermined vehicle control with a combination of a plurality of control functions, the system comprising a plurality of devices mounted on a vehicle and including a first device, and the control functions being attained by performing each software installed on the plurality of devices, the first device including:

a first storage configured to store first consistency information including a permitted combination of versions of all software installed on each of the devices; and a second storage configured to store second consistency information including one or more devices and a permitted combination of versions of software installed on each of the one or more devices in association with each of the control functions;

an electronic control unit configured to:
acquire versions of software installed on all other devices different than the first device;

determine whether consistency exists in the versions of all software installed on each of the devices by collating the version of software installed on the first device and the versions of software acquired from the other devices with the first consistency information;

determine whether the second consistency information consistent with versions of software installed on a part of the devices exists by collating the version of software installed on the first device and the versions of software acquired from the other devices with each piece of the second consistency information in response to determining that consistency does not exist in the versions of all software installed on each of the devices; and permit performance of all of the control functions upon determining that consistency exists in the versions of all software installed on each of the devices; and in response to determining that the software versions of the plurality of control functions are not compatible on all of the plurality of devices, permit performance of a subset of the plurality of control functions on the first device based on the second consistency information indicating that the software versions of the subset of the plurality of control functions are compatible with at least one version of software installed on a subset of a remainder of the plurality of devices, and prohibit performance of a remaining control functions of the plurality of control functions of the vehicle control system.

3. The vehicle control system according to claim 1, wherein the electronic control unit is configured to perform determination processing every time when a power supply of the vehicle is turned on.

4. The vehicle control system according to claim 1, wherein the software versions of the subset of the plurality of control functions that are compatible on the first device and the subset of the remainder of the plurality of devices is a combination of versions of the software which are permitted to be performed simultaneously.

* * * * *